Oct. 27, 1931.  H. A. KING  1,828,868
CLOSURE FOR PEDAL SHANK OPENINGS
Filed Oct. 28, 1930
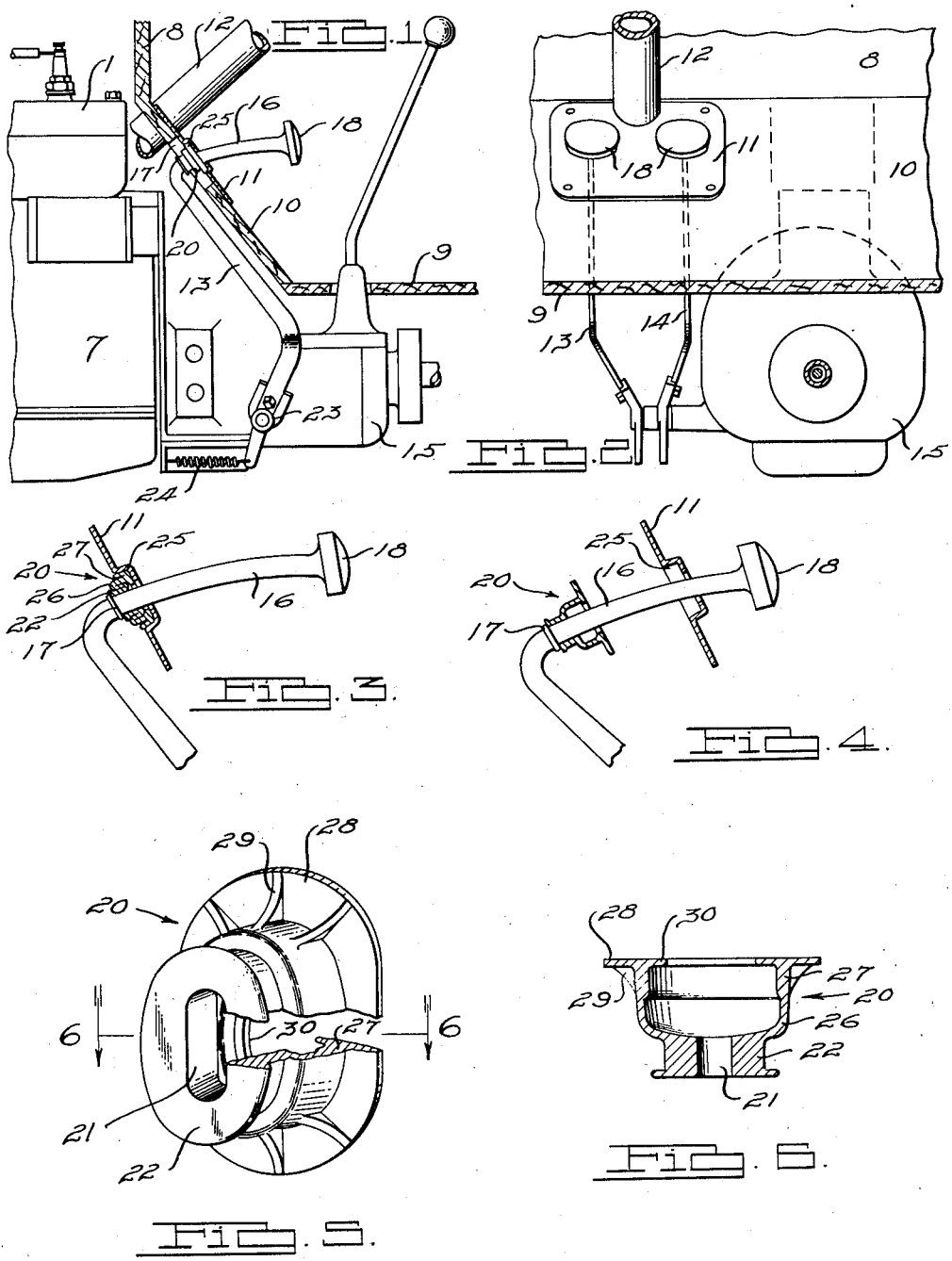
INVENTOR
Harold A. King.
BY
Harness, Dickey, Pierce & Mann,
ATTORNEYS.

Patented Oct. 27, 1931

1,828,868

UNITED STATES PATENT OFFICE

HAROLD A. KING, OF BIRMINGHAM, MICHIGAN

CLOSURE FOR PEDAL SHANK OPENINGS

Application filed October 28, 1930. Serial No. 491,760.

This invention relates to improvements in closures more particularly for the clearance space around the pedals of motor vehicles where the shank of the pedal passes through the opening in the toe board.

Objects of the invention are to provide a simple form of closure which can readily be attached, which will withstand long and hard usage and is not likely to become disarranged or damaged and become ineffective; which will provide a tight closure when the pedal is in normal position and which will brace the pedal so that it will not shake, and prevent noise and rattling.

Other objects and advantages will become apparent in the following description with reference to the accompanying drawings, in which Fig. 1 is a fragmentary side elevation of a portion of a motor vehicle with an illustrative embodiment of my invention installed therein.

Fig. 2 is a rear elevation of the same.

Fig. 3 is a view with the foot pedal in normal position and my device shown thereon in section.

Fig. 4 is a similar view with the pedal in depressed position.

Fig. 5 is a perspective view of my device with a segment broken out.

Fig. 6 is a cross section of my device.

In Figs. 1 and 2 are shown portions of the engine 7, the cowl 8, floor board 9 and the toe board 10, extending in an angular position between the cowl and the floor board.

A plate 11 is shown attached to the floor board and forming a part thereof, through suitable openings in which project the sloping steering column 12 and the brake and clutch pedals 13 and 14 at either side of the steering column. The pedals are pivoted on the transmission case 15 mounted on the rear of the engine, and the shank portion 16 which works back and forth through the floor board is formed on an arc centered at the pivot. The shank also has a collar or flange 17 integrally formed thereon, and the pedal plate 18 at the end.

My device, as shown, comprises a flexible rubber cup-shaped member 20 which has a slot 21 in the closed end or base 22, through which the shank of the pedal extends.

The cup is slipped onto the shank of the pedal by stretching sufficiently to pass over either end thereof, and is positioned so that the base abuts against the collar 17 with the rim or open end of the cup facing the toe board. When in normal position of the pedal, both pedals being substantially alike, the cup is drawn up against the floor board by the spring 24, anchored to the transmission case, which tends to rotate the pedal counterclockwise, as viewed in Fig. 1, and project the pedals rearwardly. The cup abutting against the toe board forms the stop, and the cup is formed so that it will collapse and telescope so as to hold the shank central in the hole through the toe board plate 11, a suitable socket or recess 25 being formed in the plate around the hole for receiving and centering the cup.

The shank fits snugly in the opening 21, and the base is thickened to resist expanding or stretching. Then to permit collapsing and telescoping the bowl portion 26 is flared and the walls thereof thickened to near the rim 27 which is made heavier for stiffness.

Around the open end of the cup is formed an outwardly projecting flange 28, reinforced by ribs 29, which folds back to wedge the cup into the recess or pocket 25, as shown in Fig. 3; and to prevent the cup from being completely inverted so that it could not resume its normal shape, an inwardly projecting flange 30 is also formed around the edge which cooperates with the flange 28 to prevent the end of the rim from stretching and prevents the passage therethrough of the bowl portion.

The double reverse fold is made and confined in the thin wall portions 26, and the folded walls are compressed tightly around the shank by the resilience of the backwardly bent flange 28 so that the cup forms a circular wedge around the shank in normal position of the pedal which prevents shaking and rattling as well as making a tight closure.

When the pedal is depressed, as shown in Fig. 4, the cup which is carried on the shank resumes its natural shape. Since the pedals are not depressed for any length of time, the closure is not then needed, and by my arrangement there is nothing around the shank to cause friction when the pedal is moved.

While I have shown and described but one illustrative embodiment of my invention, many omissions and alterations may be made without departing from the spirit of the invention as defined in the following claims.

Claims:

1. In a motor vehicle, the combination of a toe board having an opening therethrough, a pedal shank extending through said opening with clearance therearound and means carried on said pedal shank for closing said clearance space, said means and toe board having lateral abutting engagement for bracing said pedal shank against side shake.

2. In a motor vehicle, the combination of a toe board having an opening therethrough, a pedal shank extending through said opening with clearance therearound and means carried on said pedal shank and co-operating with said toe board for closing said clearance space, said means and toe board having lateral abutting engagement for bracing said pedal shank against side shake.

3. In a motor vehicle, the combination of a toe board having an opening therethrough, a pedal shank extending through said opening with clearance therearound and a cup carried on said pedal shank for closing said clearance space and for bracing said pedal shank against side shake, said cup having yielding side walls for adjustably positioning the rim thereof against said toe board.

4. In a motor vehicle, the combination of a toe board having an opening therethrough, a pedal shank extending through said opening with clearance therearound and a rubber cup having its base carried on said pedal shank for closing said clearance space and for bracing said pedal shank against side shake, said cup having yielding side walls for adjustably positioning the rim thereof against said toe boards.

5. In a motor vehicle, the combination of a toe board having an opening therethrough and a socket surrounding said opening, a pedal shank extending through said opening with clearance therearound and means carried on said pedal shank and receivable in said socket for closing said clearance space and for bracing said pedal shank against side shake.

6. In a motor vehicle, the combination of a toe board having an opening therethrough and a socket surrounding said opening, a pedal shank extending through said opening with clearance therearound and a rubber cup carried on said pedal shank and receivable in said socket for closing said clearance space and for bracing said pedal shank against side shake.

7. In a motor vehicle, the combination of a toe board having an opening therethrough, a pedal shank extending through said opening with clearance therearound, a rubber cup surrounding said pedal shank and carried thereby and means surrounding said opening in spaced relation thereto for engaging the peripheral rim of said cup for closing said clearance space and for bracing said pedal shank against side shake.

8. A closure device for pedal openings in vehicle toe boards comprising a cup-shaped article of yielding material having an opening through the base thereof for snugly embracing a pedal shank, an outwardly flared bowl portion, a rim portion and an inwardly extending flange on said rim portion for resisting the passage therethrough of said base portion when the article is collapsed and telescoping.

9. A closure device for pedal openings in vehicle toe boards comprising a cup-shaped article of yielding material having an opening through the base thereof for snugly embracing a pedal shank, an outwardly flared bowl portion, a rim portion, an inwardly extending flange on said rim portion for resisting the passage therethrough of said base portion when the article is collapsed and telescoping, and an outwardly extending flange on said base portion for further resisting such movement.

10. A closure device for pedal openings in vehicle toe boards comprising a cup-shaped article of yielding material having an opening through the base thereof for snugly embracing a pedal shank, an outwardly flared bowl portion, a rim portion, and an inwardly extending flange on said rim portion for resisting the passage therethrough of said base portion when the article is collapsed and telescoping, said base and rim portions being relatively thick-walled and said intermediate bowl portion being relatively thin-walled.

11. A closure device for pedal openings in vehicle toe boards comprising a cup shaped article of yielding material having an opening through the base thereof for snugly embracing a pedal shank, an outwardly flared bowl portion and a rim portion, the interior of said rim portion and the exterior of said base portion being proportioned in size as to snugly embrace opposite sides of said bowl portion when the base portion is telescoped into the rim portion.

12. A closure device for pedal openings in vehicle toe boards comprising a cup shaped article of yielding material having an opening through the base thereof for snugly embracing a pedal shank, an outwardly flared bowl portion and a rim portion, the interior of said rim portion and the exterior of said base portion being proportioned in size as to snugly embrace opposite sides of said bowl portion when the base portion is telescoped into the rim portion.

13. A closure device for pedal openings in vehicle toe boards comprising a cup-shaped article of yielding material having an opening through the base thereof for snugly embracing a pedal shank, an outwardly flared bowl portion, a rim portion, and an inwardly extending flange on said rim portion for resisting the passage therethrough of said base portion when the article is collapsed and telescoping, said base and rim portions being relatively thick-walled and said intermediate bowl portion being relatively thin-walled, the interior of said rim portion and the exterior of said base portion being proportioned in size so as to snugly embrace opposite sides of said bowl portion when the base portion is telescoped into the rim portion.

14. A closure device for pedal openings in vehicle toe boards comprising a cup-shaped article of yielding material having an opening through the base thereof for snugly embracing a pedal shank, an outwardly flared bowl portion, a rim portion and inwardly and outwardly extending flanges on the terminating edge of said rim portion.

HAROLD A. KING.